E. S. BLAKE.
Lamp Chimney.
No. 35,866.
Patented July 15, 1862.
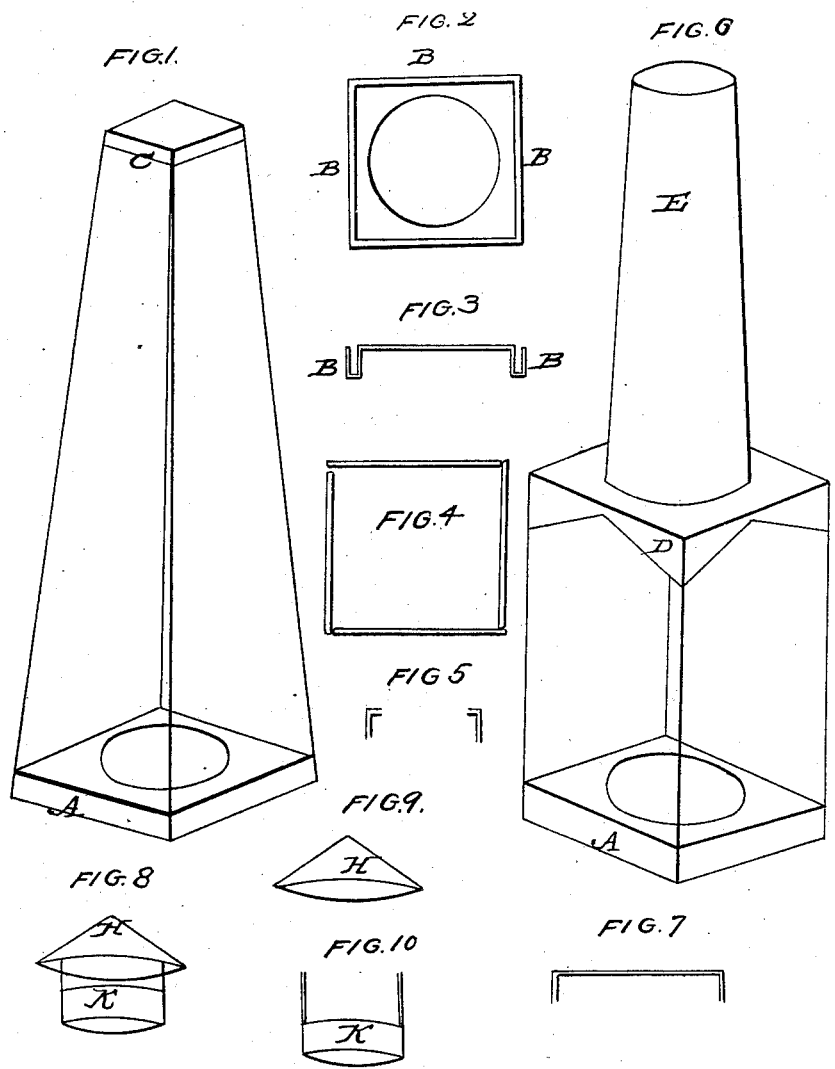

UNITED STATES PATENT OFFICE.

E. S. BLAKE, OF PITTSBURG, PENNSYLVANIA.

IMPROVEMENT IN LAMP-CHIMNEYS.

Specification forming part of Letters Patent No. 35,866, dated July 15, 1862.

*To all whom it may concern:*

Be it known that I, E. S. BLAKE, of Pittsburg, county of Allegheny, State of Pennsylvania, have invented certain Improvements in the Construction of Lamp-Chimneys; and I do hereby declare that the following is a full and exact description thereof, reference being had to the accompanying drawings, and to the letters of reference marked thereon.

My first improvement consists in employing, to constitute in whole or in part the shaft of a lamp-chimney, several pieces of flat glass, any one of which, if broken in use, may be replaced at small cost.

My second improvement in lamp-chimneys consists in providing the top of the shaft with a shield or cover to prevent the flame from being extinguished when the lamp is exposed to strong currents of air.

My lamp-chimney, when its shaft is made wholly of glass, is constructed as follows: The base upon which the shaft of the chimney rests consists of a metallic plate, A, Figure 1. (Shown separately in top view in Fig. 2, and in section, Fig. 3.) Through the center of this plate is a hole of the proper size and form for placing the plate in and securing it to the lamp-burner. The periphery of the plate is a figure having straight sides equal in number to the number of strips of glass I propose to use in forming the shaft of the chimney, and each of these sides is bounded by a deep groove, B.

To form the shaft of the chimney, I cut from common window-glass or other flat plates of glass strips equal in length to the proposed height of the shaft and of width equal to the length of the groove (on each side of the plate) less the thickness of the glass employed. I insert the ends of the pieces of glass in the grooves in an alternate order, such that one edge of each piece rests against the side of an adjoining piece, as shown in horizontal section, Fig. 4. Thus a complete tubular inclosure is formed for the shaft, and each piece of glass aids in maintaining the upright position of another. The plate A is made of thin elastic metal, and the exterior walls of its grooves are turned in, so as to press upon the glass when inserted, and thus give it stability.

The strips of glass may be cut tapering, so that the shaft will converge to any required diameter at the top. To confine the strips of glass together at the top, I employ a band, C, of thin metal, with its upper edge turned inward to rest on the top of the glass, as shown in section, Fig. 5, or a metallic cup with a central opening may be employed for the purpose.

Fig. 6 shows my method of constructing the chimney when the lower part only of the shaft is made of glass, the upper part being made of sheet-brass or other metal. In this case the strips of glass extend upward from the base to such height only as is required for a lateral diffusion of the light of the lamp, and are there held together by a plate, D, the edges of which are turned down, as shown in section, Fig. 7, to embrace the ends of the glass plates, or (the pieces of glass being held together by a band, like C, Figs. 1 and 5) the edges of the plate D may be turned inward and downward, so as to enter instead of embracing the glass part of the shaft, or the plate D may be provided with grooves to receive the glass, as in plate A. Into the central opening of this plate D is secured a metallic tube, E, to form the upper portion of the shaft.

My second improvement in lamp-chimneys consists in providing the top of the shaft with a shield or cover to prevent the flame from being extinguished when the lamp is used out-of-doors or exposed to wind, the effect of the shield being to prevent a sudden and rapid current of air from descending the shaft, and thus extinguishing the light. This shield may be made and applied in any way in which it will serve to prevent direct currents down the shaft without too much impeding the upward draft of the shaft.

One of the forms in which the shield may be made and applied is shown in Figs. 8, 9, and 10. H is the shield, consisting of a conical shell of thin metal, the base of which is somewhat larger in diameter than the top of the shaft to which it is to be applied. This is supported by two or more wires or pillars extending upward from the hoop or band K to such height as to allow sufficient space between the band and shield for the escape of the heated air of the shaft. When applied to the chimney, the band K is to embrace the upper end of the shaft.

I do not claim the making of the upper part of the shaft of a lamp-chimney of metal; but What I do claim, and desire to secure by Letters Patent, is—

1. The mode herein described of constructing lamp-chimneys—that is to say, making the shaft in whole or in part of several pieces of flat glass arranged as herein described.

2. The base constructed to receive the lower ends of flat plates of glass, for the purposes above set forth.

3. The metallic top when the same is provided with a base or plate adapted to receive or form a joint with the upper ends of flat plates of glass and is designed to be used in combination with such plates, in the manner and for the purposes herein set forth.

4. A shield for the top of the shaft of a lamp-chimney for the purpose of preventing the extinguishment of the flame by currents of air, as herein described.

E. S. BLAKE.

Witnesses:
I. T. ESTEP,
J. M. CORNWELL.